United States Patent [19]
Etter

[11] 3,805,819

[45] Apr. 23, 1974

[54] METHOD AND MEANS OF APPLYING ADDITIVES TO INDUSTRIAL GAS

[76] Inventor: Berwyn E. Etter, 10355 Paradise Blvd., Treasure Island, Fla. 33740

[22] Filed: Dec. 6, 1972

[21] Appl. No.: 312,570

Related U.S. Application Data

[63] Continuation-in-part of Ser. No. 295,133, Oct. 5, 1972.

[52] U.S. Cl.................. 137/208, 137/113, 137/209, 239/372
[51] Int. Cl................................................ F04f 1/18
[58] Field of Search ........... 137/113, 208, 209, 255, 137/256, 265; 222/4, 6; 239/372

[56] References Cited
UNITED STATES PATENTS
2,424,440   7/1947   Duffy................................ 137/208

Primary Examiner—Alan Cohan
Assistant Examiner—Gerald A. Michalsky
Attorney, Agent, or Firm—Zarley, McKee & Thomte

[57] ABSTRACT

The means for applying additive to industrial gas comprises a pair of additive mixing tanks which are in communication with a source of industrial gas and a cutting torch. In normal operation, only one of the mixing tanks supplies the industrial gas-additive mixture to the cutting torch through a valve system. The second mixing tank is automatically put "on line" upon the first mixing tank becoming empty of additive. The valve system permits the empty tank to be replaced without interrupting the operation of the cutting torch.

5 Claims, 4 Drawing Figures

PATENTED APR 23 1974 3,805,819
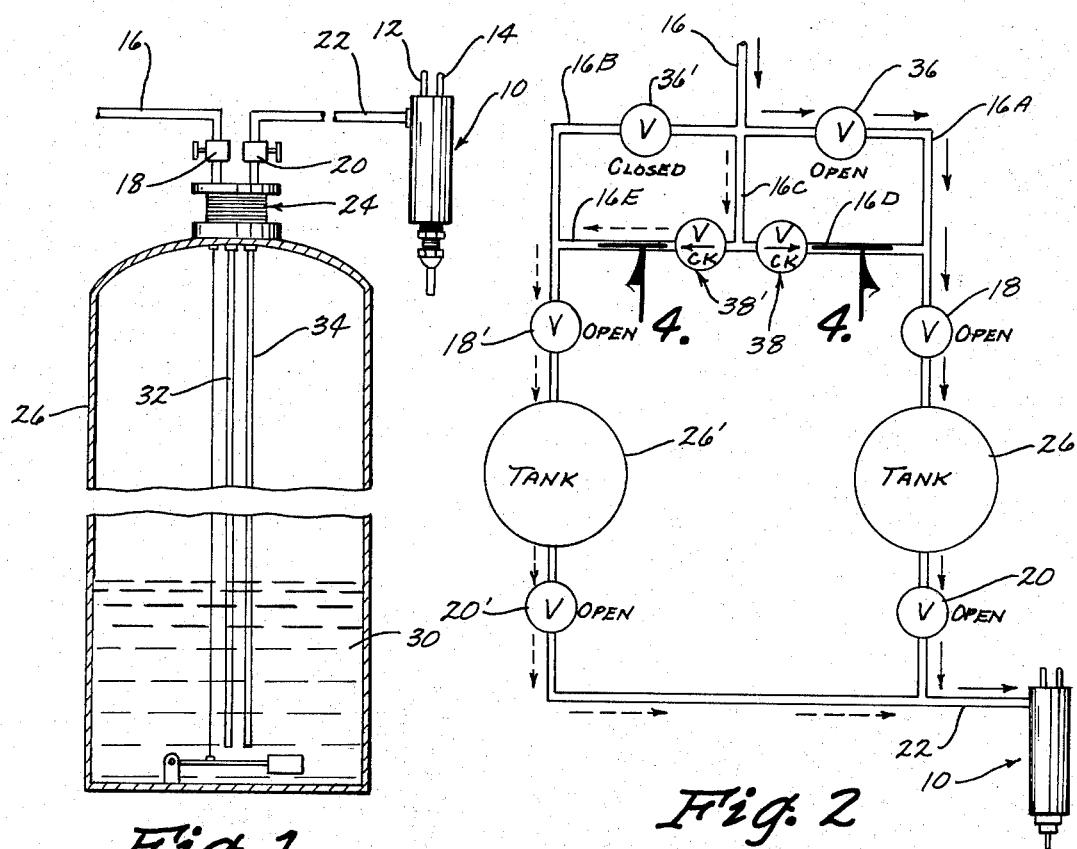
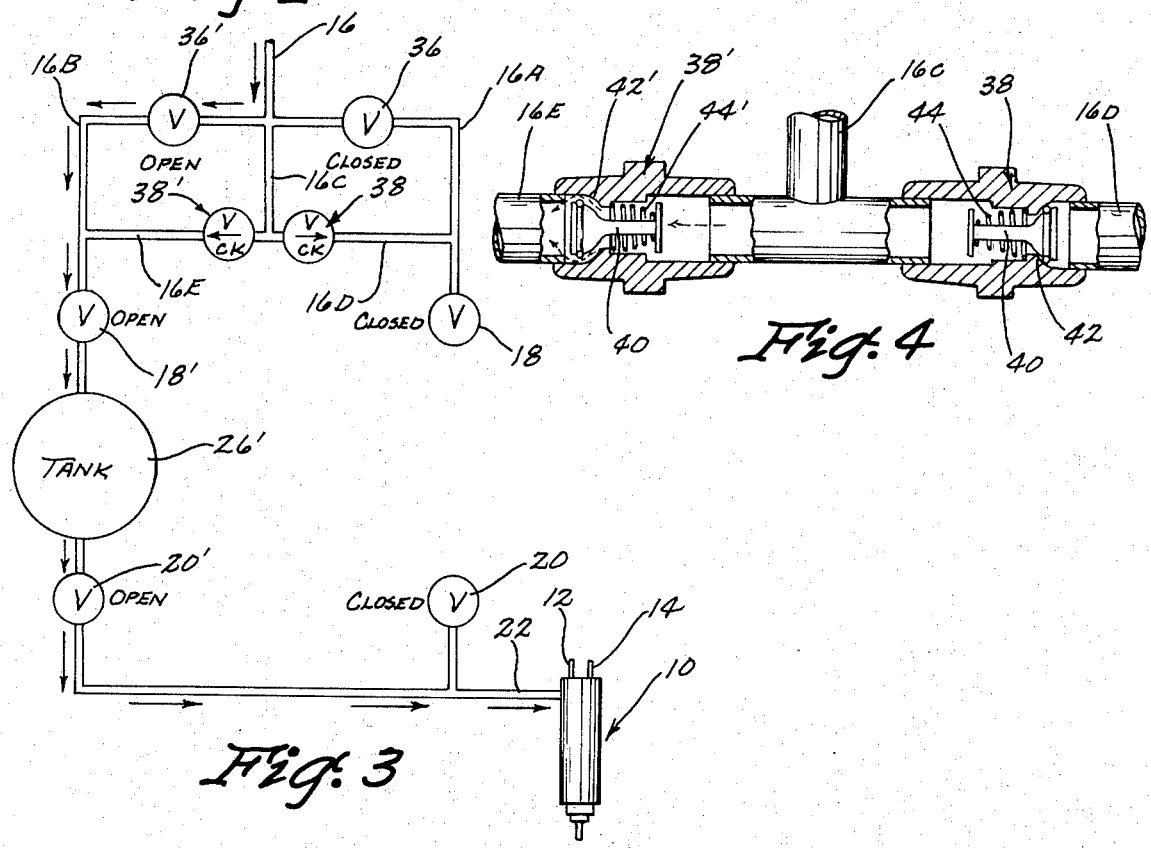

3,805,819

METHOD AND MEANS OF APPLYING ADDITIVES TO INDUSTRIAL GAS

This is a continuation-in-part application of application, Ser. No. 295,133, filed Oct. 5, 1972.

BACKGROUND OF THE INVENTION

Cutting torches are employed to cut metal plates or the like. The torches usually burn a mixture of fuel gas such as propane or the like, oxygen and industrial gas. It is highly desirable to add additives to the mixture to achieve improved cutting efficiency. Many types of additives are utilized, one of such additives being manufactured and sold under the trademark Flamex. Previously is has been somewhat difficult to mix the additives with the fuel gas in an efficient manner. Heretofore, the additive and the fuel gas were placed in a container and the container placed in communication with the cutting torch. This procedure requires a huge number of containers or tanks to be employed thereby increasing the inventory cost of such an operation.

The apparatus for applying additives to industrial gas disclosed in the said co-pending application provides a convenient and efficient means of adding the additive to the industrial gas. A problem encountered with the apparatus of the co-pending application is the amount of "down time" required when the additive mixing tank is replaced. In other words, the cutting torch cannot be operated when the additive tank is being replaced.

Therefore, it is a principal object of this invention to provide a means for applying additives to industrial gas.

A further object of the invention is to provide a method and means for applying additives to industrial gas comprising a pair of additive mixing tanks.

A further object of the invention is to provide a method and means of applying additives to industrial gas which automatically places a second additive tank "on line" when the primary tank becomes empty.

A further object of the invention is to provide a method and means for applying additives to industrial gas which does not require any "down time" when one of the additive tanks is being replaced.

A further object of the invention is to provide a method and means for applying additives to industrial gas which is economical of manufacture and durable in use.

These and other objects will be apparent to those skilled in the art.

BRIEF DESCRIPTION OF THE DRAWINGS

This invention consists in the contruction, arrangements and combination of the various parts of the device, whereby the objects contemplated are attained as hereinafter more fully set forth, specifically pointed out in the claims, and illustrated in the accompanying drawings, in which:

FIG. 1 is a fragmentary sectional view of the additive mixing tank of the co-pending application;

FIG. 2 is a schematic of the means for applying additives to industrial gas;

FIG. 3 is a schematic similar to FIG. 2 except that one of the mixing tanks has been removed from the system to permit its replacement; and FIG. 4 is a fragmentary sectional view seen along lines 4 — 4 of FIG. 2.

DESCRIPTION OF THE PREFERRED EMBODIMENT

In the drawings, the numeral 10 refers generally to a conventional cutting torch for cutting metal objects. Cutting torch 10 has conduits 12 and 14 extending therefrom which are in communication with sources of oxygen and industrial gas respectively. The numeral 16 refers to a conduit which is in communication with the source of fuel gas such as propane or the like. A manually operated valve 18 is provided in the conduit 16 while a manually operated valve 20 is provided in the conduit 22 which extends from the torch 10 to a fitting generally designated by the reference numeral 24.

Fitting 24 is threadably mounted in the upper end of the container 26 having liquid additive provided therein generally designated by the reference numeral 30. The fitting 24 and tank 26 are described in detail in the copending application and reliance on that disclosure is made herein. The fitting 24 and the dip tubes 32 and 34 cooperate to mix the additive 30 with the industrial gas as the industrial gas passes through the tank outwardly through the conduit 22.

The mixing of the industrial gas and the additive 30, as well as the means of forcing the additive 30 from tank 26 are well known and described in detail in my previously incorporated be reference application Ser. No. 295,133. Briefly, as seen in FIG. 1, and as described in more detail in my prior application at page 4 thereof, there is shown a float at the bottom of tank 26. The float is connected by a rod to a float valve within fitting 24. The float valve is not depicted in this figure. The float is buoyed upwardly by additives 30 and the float valve within the fitting 24 is urged open. Of course, as the level of additive 30 becomes too low to buoy up the float, the float valve closes shutting off the communication with tank 26. Since the float valve in fitting 24 is normally open fuel gas enters tank 26. The fuel gas exerts pressure on additive 30 which causes it to rise upwardly through the dip tubes 32 and 34. This is explained in greater detail in my prior application Ser. No. 295,133, filed Oct. 5, 1972.

The numeral 26' refers to a tank identical to tank 26 with the numerals 18' and 20' referring to valves which correspond to the valves 18 and 20 respectively. A manually operated valve 36 is imposed in conduit 16A and a valve 36' is imposed in conduit 16B. The numeral 16C refers to a conduit which is in communication with conduit 16 and which is in communication with conduit 16D and conduit 16E. As seen in FIG. 2, conduit 16D communicates with conduit 16A and conduit 16E communicates with conduit 16B.

The numeral 38 refers to a normally closed check valve which is provided in conduit 16D. Check valve 38 generally comprises a valve member 40 which is normally urged into sealing engagement with the valve seat 42 by spring 44. The numeral 38' refers to a check valve imposed in conduit 16E generally comprising a valve member 40' which is normally urged into sealing engagement with the valve seat 42' by spring 44'.

In normal operation, tank 26 would ordinarily be in communication with the torch 10 to supply the industrial gas-additive mixture thereto. Initially, valves 36, 18 and 20 are in an open condition. Valve 36' is initially closed with valves 18' and 20' being initially open. Likewise, the check valves 38 and 38' are normally closed. It can be seen that tank 26' is not initially "on line" since the valve 36' is closed. Industrial gas will not be fed through the check valve 38' since the pressure in conduit 16C is not sufficient to overcome the spring 44' due to the fact that there is substantial pressure on the left-hand side of the valve member 40' (as viewed in FIG. 4) so as to urge the valve member 40' into its closed position.

If tank 26 becomes empty, tank 26' automatically goes "on line" since the check valve 38' experiences a presure drop on the down stream side of the valve member 40' as a result of the float valve in tank 26 closing, sufficient so that the pressure of the industrial gas in conduit 16C will open the valve member 40' so that the industrial gas will be fed to the tank 26' through the conduit 16E and the valve 18. The industrial gas is mixed with the additive in the tank 26' and fed to the torch 10.

The operator of the torch will sense when the second tank 26' goes "on line" by reason of the sound factor and other factors such as condensation of moisture on the tank 26' when it is in use. At some point after the operator detects that the tank 26' is in operation, he will open valve 36'. Valves 36, 18 and 20 are closed to permit the tank 26 to be replaced. The tank 26 can be removed and replaced by the maintenance department at their convenience and the operator can continue his work without interruption. When the tank 26 has been replaced, valves 18 and 20 are again opened but the valve 36 is kept closed until such time as the operator detects that the tank 26' is empty. When tank 26' becomes empty, the check valve 38 operates in the same manner as did check valve 38' as previously discussed.

Thus it can be seen that a method and means has been described for automatically placing a second additive tank into operation upon the first tank becoming empty. The method and means described herein does not require "down time" of the cutting torch 10 which substantially increases the efficiency of the operation. It can therefore be seen that the method and means accomplishes at least all of its stated objectives.

I claim:

1. In combination,
a first additive mixing tank means for mixing additive with a fuel gas, said tank having a float valve means which shuts off the supply of fuel gas when the additive level becomes very low,
a normally open first valve means,
a first conduit means in communication with the discharge side of said first valve means and the inlet side of said first tank means,
a torch means,
a second conduit means in communication with said torch means and the discharge side of said first tank means,
a normally closed first check valve means,
a third conduit means in communication with said first conduit means and the outlet side of said first check valve means,
a fourth conduit means in communication with the inlet side of said first valve means and a source of fuel gas, and also in communication with the inlet side of said first check valve means,
a second additive mixing tank means for mixing additive with a fuel gas,
a normally closed second valve means,
a fifth conduit means in communication with the discharge side of said second valve means and the inlet side of said second tank means,
a sixth conduit means in communication with the discharge side of said second tank means and said torch means,
a normally closed second check valve means,
and a seventh conduit means in communication with said fifth conduit means and the outlet side of said second check valve means,
the inlet side of said second valve means and said second check valve means being in communication with said fourth conduit means.

2. The combination of claim 1 wherein said second check valve means is normally closed but moves to an open position, upon the additive in said first tank means dropping to a predetermined level, to permit the fuel gas to bypass said second valve means and to be supplied to said second tank means through said fourth, seventh and fifth conduit means.

3. The combination of claim 1 wherein third and fourth valves are provided in said first and second conduit means respectively, to permit said first tank means to be replaced.

4. The combination of claim 3 wherein fifth and sixth valves are provided in said fifth and sixth conduit means to permit said second tank means to be replaced.

5. The combination of claim 1 wherein said first check valve means is normally closed but moves to an open position, upon the additive in said second tank means dropping to a predetermined level, to permit the fuel gas to by-pass said first valve means and to be supplied to said first tank means through said fourth, third and first conduit means when said second valve means is open and said first valve means is closed.

* * * * *